United States Patent
Baentsch et al.

(10) Patent No.: US 7,543,159 B2
(45) Date of Patent: Jun. 2, 2009

(54) DEVICE AND METHOD WITH REDUCED INFORMATION LEAKAGE

(75) Inventors: Michael Baentsch, Langnau am Albis (CH); Peter Buhler, Horgen (CH); Thomas Eirich, Waedenswil (CH); Frank Hoering, Zurich (CH); Marcus Oestreicher, Zurich (CH); Thomas D. Weigold, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 920 days.

(21) Appl. No.: 10/495,345

(22) PCT Filed: Nov. 5, 2002

(86) PCT No.: PCT/IB02/04620

§ 371 (c)(1),
(2), (4) Date: Nov. 3, 2004

(87) PCT Pub. No.: WO03/042799

PCT Pub. Date: May 22, 2003

(65) Prior Publication Data

US 2006/0090081 A1   Apr. 27, 2006

(30) Foreign Application Priority Data

Nov. 14, 2001 (EP) .................................. 01811093

(51) Int. Cl.
*G06F 12/14* (2006.01)
(52) U.S. Cl. ...................... 713/193; 713/189; 713/194; 380/281
(58) Field of Classification Search ................. 380/281, 380/284
See application file for complete search history.

(56) References Cited

U.S. PATENT DOCUMENTS 4,888,802 A   12/1989   Cooney ...................... 380/277

(Continued)

FOREIGN PATENT DOCUMENTS

EP   0 753 816   1/1997

(Continued)

OTHER PUBLICATIONS

Deris Praca et al., "From smart cards to smart objects: the roads to new smart technologies" Computer Networks, vol. 36, Issue 4, pp. 381-389 (Jul. 16, 2001).

(Continued)

*Primary Examiner*—Jung Kim
(74) *Attorney, Agent, or Firm*—Ido Tuchman; Kenneth R. Corsello (57) ABSTRACT

Provides a data processing system comprising a processor and encrypted information in a first persistent memory whose level of information leakage is higher than that of a second persistent memory. The second persistent memory stores a cryptographic key for decrypting the encrypted information, generating therefrom unencrypted information that is usable by the processor for executing an operation. The cryptographic key may be used for encrypting the unencrypted information, generating the encrypted information. Also provided is a method of processing such a data-processing system with an operating system, comprising writing unencrypted information into the first persistent memory, encrypting the unencrypted information under use of the first cryptographic key, creating therefrom encrypted information in the first persistent memory, and setting the data-processing system to a state in which writing into the first persistent memory is controlled by the operating system.

1 Claim, 1 Drawing Sheet

U.S. PATENT DOCUMENTS

| | | | |
|---|---|---|---|
| 5,457,748 A | 10/1995 | Bergum et al. | 380/270 |
| 6,304,658 B1 * | 10/2001 | Kocher et al. | 380/30 |
| 7,194,633 B2 * | 3/2007 | Kaiserswerth et al. | 713/189 |

FOREIGN PATENT DOCUMENTS

| | | | |
|---|---|---|---|
| EP | 0753816 | * | 1/1997 |
| JP | 02-005158 | | 1/1990 |
| JP | 8-95942 A | | 4/1996 |
| JP | 09-073415 | | 3/1997 |
| JP | 9114731 A | | 5/1997 |
| JP | 10214232 A | | 8/1998 |
| JP | 10254848 A | | 9/1998 |
| JP | 10-334205 | | 12/1998 |
| JP | 2001005731 A | | 1/2001 |
| JP | 2001-092927 | | 4/2001 |
| JP | 2002-229861 | | 8/2002 |
| WO | WO 99/38078 | | 7/1999 |
| WO | WO 00/19366 | | 4/2000 |
| WO | WO 00/42511 | | 7/2000 |

OTHER PUBLICATIONS

Suresh Chari et al., A Cautionary Note Regarding Evaluation of AES Candidates on Smart-Cards, Feb. 1, 1999, pp. 1-15.

Thomas S. Messerges et al., Investigations of Power Analysis Attacks on Smartcards, May 10, 1999, pp. 1-12.

* cited by examiner

Fig. 1

DEVICE AND METHOD WITH REDUCED INFORMATION LEAKAGE

CROSS REFERENCE AND PRIORITY

This application filed under 35 USC 371, is cross-referenced with, and claims priority from, International Patent Application PCT/IB02/04620 filed on Nov. 5, 2002, and published in English with Publication No. WO03/042799 on May 22, 2003, under PCT article 21(2), which in turn claims priority of European Patent, filed on Nov. 14, 2001, Application No. 01811093.2.

The invention relates to a data-processing system, a method for processing the same, and a method for executing an operation on the same. More particularly the invention relates to a smartcard, a method of processing the smartcard under use of a cryptographic key, and a method for executing an operation on the smartcard under use of the cryptographic key.

TECHNICAL FIELD AND BACKGROUND OF THE INVENTION

Cryptographic operations are used for a variety of processes such as data encryption and authentication. In a typical symmetric cryptographic process, a secret key is known to two or more participants, who use it to secure their communications. In systems using asymmetric or public-key cryptography, one party typically performs operations using a secret key, e.g., the so-called private key, while the other performs complementary operations using only non-secret parameters, e.g., the so-called public key. In both, symmetric and asymmetric, cryptosystems, the secret parameters must be kept confidential, since an attacker who compromises a key can decrypt communications, forge signatures, perform unauthorized transactions, impersonate users, or cause other problems.

Methods for securely managing cryptographic keys using physically secure, shielded rooms are known and are widely used. However, the known methods for protecting keys in cryptographic devices are often inadequate for many applications, such as those requiring a high degree of tamper resistance.

Attacks such as reverse-engineering of a ROM using microscopes, timing attack cryptanalysis, as described for example by P. Kocher in "Timing Attacks on Implementations of Diffie-Hellman, RSA, DSS, and Other Systems," Advances in Cryptology—CRYPTO '96, Springer-Verlag, pages 104-113, and error analysis as described for example by E. Biham and A. Shamir in "Differential Fault Analysis of Secret Key Cryptosystems," Advances in Cryptology—CRYPTO '97, Springer-Verlag, 1997, pages 513-525, are known for analyzing cryptosystems.

Ciphers and algorithms believed to be cryptographically secure are known. For example, protocols using triple DES. i.e. a cipher constructed using three applications of the Data Encryption Standard using different keys, can resist cryptanalytic attacks, provided that attackers only have access to the standard inputs to and outputs from the protocol. However, even a product using an extremely strong cipher such as triple DES can be insecure if the keys are not managed securely. Smartcards commonly encode their internal data using a cryptographic technique such as the Data Encryption Standard (DES). A detailed description of DES is presented by Bruce Schneier in Applied Cryptography, 2n' edition, ISBN 0 11709-91 1996, John Wiley & Sons, at pp. 265. The Federal Information Processing Standard (FIPS) description of DES is contained in FIPS publication 46-3, available on the Internet at http://csrc.nist.gov/fips/.

DES is a block cipher method using a 64 bit key (of which only 56 bits are actually used), which is very fast and has been widely adopted. Though DES can be cracked by a brute-force attack, i.e. simply testing all possible keys, triple DES is still considered very secure. For the purposes of the examples described hereinafter, it is sufficient to know that the DES algorithm performs 16 rounds which effect lookups to eight separate translation tables called S-boxes. Other similar cryptographic techniques are also known in the art, including. triple DES, IDEA, SEAL, and RC4; public key (asymmetric) encryption and decryption using RSA and E1 Gamal; digital signatures using DSA, E1 Gamal, and RSA; and Diffie-Hellman key agreement protocols. Despite the theoretical strength and complexity of these cryptographic systems, power analysis techniques have been developed which allow these keys to be cracked much more quickly.

Information on DES and other cryptographic algorithms can also be found in the Handbook of Applied Cryptography by Menezes et al. (CRC Press, Inc., 1997). The Data Encryption Standard (DES) is widely used as a cryptographic primitive for data encryption, pseudo-random number generation, MACs, and other cryptographic operations. The basic DES encryption algorithm uses a 56-bit key to transform a 64-bit plaintext block into a 64-bit ciphertext block. The corresponding decryption operation uses the same key to transform ciphertext blocks into their corresponding plaintexts.

To obtain a secret key from a cryptographic system, also referred to as cryptosystem, an attacker can exploit the fact that such a system leaks information. The attacker can try to gather data by observing a series of operations, perform statistical analysis on the observations, and use the results to determine the key. In a common situation, an attacker monitors a physical property, such as power consumption, of a secure token as it performs a cryptographic operation. The attacker collects a small amount of data related to the key each time the token is observed performing a cryptographic operation involving the key. The attacker increases the amount of information known about the key by collecting and statistically correlating or combining data from multiple observations of the token as it performs operations involving the key. In the case of a cryptosystem which is leaking information, such observations may contain signal information, i.e., information correlated usefully to the key. However, such observations also contain noise, i.e., information and error that hinder or are irrelevant to determination of the key. The quality of the information gained from these observations is characterized by a "signal to noise" or S/N ratio, which is a measure of the magnitude of the signal compared to the amount of noise. The number of operations that the attacker must analyze to recover the key depends on the measurement and analysis techniques, but is generally inversely proportional to the square of the S/N ratio. The constant of proportionality also depends upon the amount of confidence the attacker requires. For example, a relatively low confidence level may be acceptable to an attacker willing to do an optimized brute force search using statistical information about key bit values. Decreasing the signal by a factor of 15 and increasing the amount of measurement noise by a factor of 20 will reduce the signal-to-noise ratio by a factor of 300. This will generally mean that an attacker will require roughly 90,000 times as many observations to extract the same amount of information about the key. An attack requiring 1,000 observations to recover a key before the S/N reduction would now require on the order of 90 million observations to gain the same level of confidence in the recovered key.

Examples of DPA being used to extract a DES key are presented by Paul Kocher, Joshua Jaffe, and Benjamin June, 1998, "Introduction to differential power analysis and related attacks", available at http://www.cryptography.com/dpa/technical; or by Thomas S. Messerges, Ezzy A. Dabbish, and Robert H. Sloan, 1999, in "Investigations of power analysis attacks on smart cards", Usenix '99; see http://www.eecs.edu/-tmesserg/usenix99/html/paper.html; and also by Louis Goubin and Jacques Patarin, 1999, in "DES and differential power analysis: the "duplication" method", Proceedings of CHES '99, Springer Lecture Notes in Computer Science, vol. 1717 (August 1999); http://www.cryptosoft.com/htmi/secpub.htm#goubin.

A principal objective is to make a cryptosystem that is difficult to attack successfully, for example by increasing the number of observations required by an attacker to compromise a key. By reducing the available signal size and/or increasing the amount of error, noise, and uncertainty in attackers' measurements, a system designer can make the so-called work function. i.e. the effort required to break a system, larger. Ideally, the number of samples required to gain any significant amount of useful key information should exceed the maximum number of transactions that can be performed using the key, exceed the number of transactions that can be performed by the device, e.g., before the key expires, or else be so large that monitoring attacks are of comparable or greater difficulty than brute force and other known attacks. For example, if attackers are limited to measurements with a signal-to-noise ratio across an entire transaction well below 1/1000 in a system programmed to self-destruct after one million operations, which is well beyond the expected operational life of most smartcards, the attacker would be unable to collect enough measurements to compromise the device. For physically large systems, effective physical shielding, physical isolation, and careful filtering of inputs and outputs can protect cryptographic devices from external monitoring attacks that involve analyzing power consumption, electromagnetic radiation, electrical activity within the device, etc. as well as protecting against physical attacks. However, these techniques are difficult to apply in constrained engineering environments. For example, physical constraints such as size and weight, cost requirements, and the need to conserve power can prevent the use of the known shielding techniques.

Keeping electronic information hidden from hostile parties is desirable in many environments, whether personal, business, government, or military. "Sealed platforms", which are special kinds of electronic hardware devices, have been developed to satisfy this need. The term "platform" generally refers to a hardware/software environment capable of supporting computation including the execution of software programs. A "sealed" platform refers to a platform purposely built to frustrate reverse-engineering.

In contrast to traditional credit and debit cards which store a small amount of information on a magnetic strip, the sealed platforms such as smartcards, may store and process a significantly larger quantity of data using microprocessors, random access memory (RAM), and read only memory (ROM). The sealed platforms are typically secured using cryptographic technology which is intended to maintain and manipulate secret parameters in open environments without revealing their values. Compromise of a secret key used to compute a digital signature could, for example, allow an attacker to forge the owner's digital signature and execute fraudulent transactions.

A sealed platform is intended to perform its function while protecting information and algorithms, such as performing digital signatures as part of a challenge-response protocol, authenticating commands or requests, and encrypting or decrypting arbitrary data. A smartcard used in a stored value system may, for example, digitally sign or compute parameters such as the smart card's serial number, balance, expiration date, transaction counter, currency, and transaction amount as part of a value transfer.

Power analysis is the process of gathering information about the data and algorithms embodied on a platform by means of the "power signature" of the platform. The "power signature" of a platform is its power consumption profile measured over time, while executing the software stored on that platform. The power consumed by a microprocessor, micro-controller or similar electronic device changes with the state of the electronic components in the device. Such devices generally represent data in terms of binary 1s and 0s, which are represented in the electronic devices as corresponding high or low voltage levels. For example, a value of 1 may be represented by +5 volts and a value of 0 by 0 volts.

Hence, the amount of power that a sealed platform consumes may be correlated with the number of binary 1s in a data word, at a given moment in time. It follows that the amount of current drawn by, and the electromagnetic radiation emanated from a sealed platform, may be correlated to the secrets being manipulated within it. Such signals can be measured and analyzed by attackers to recover secret keys. State transitions are also a major influence on the power consumption of a device performing a computation. As the value of a bit changes, transistor switches associated with that bit change state. Therefore, there is an increase in the amount of power consumed when the system is in transition. Attackers can non-invasively extract secret keys using external measurement and analysis of a device's power consumption, electromagnetic radiation, or processor cycle timing during performance of cryptographic operations. The current and voltage being supplied to the smartcard may be monitored while it is executing.

In simple power analysis (SPA), the power signature for the execution of a given algorithm is used to determine information about the algorithm and its data. Generally, power data is gathered from many executions and averaged at each point in time in the profile.

For example, if SPA is used to attack a DES key space, and the attacker has access to the specific code, but not the particular DES key, a particular series of points in the power signature may indicate the number of 1 and 0s in each 8-bit byte of the DES key. This reduces the space of possible keys for an exhaustive all-possible-keys attack from $2^{56}$ possible keys to $2^{38}$ possible keys, if parity bits are stored for each byte of the key, making search time among possible keys about $2^{18}$ times shorter.

Differential power analysis (DPA) is a form of power analysis in which information is extracted by means of gathering multiple power signatures and analyzing the differences between them. For certain kinds of data and algorithms, exhibiting repetitious behavior, it is an extraordinarily effective method for penetrating secrets stored on sealed platforms. It can reveal information about the data resulting from computations, fetches from memory stores to memory, the data addresses in the memory of the sealed platform from which data are fetched or to which data are stored during execution, and the code addresses from which instructions are fetched during the execution of algorithms on the sealed-platform. These capabilities render protection of sealed platforms against DPA attack both very important to security and very difficult to achieve on inexpensive sealed platforms. While SPA attacks use primarily visual inspection to identify relevant power fluctuations, DPA attacks use statistical analysis and error correction techniques to extract information correlated to secret keys. Hence, DPA is a much more powerful attack than SPA, and is much more difficult to prevent. One use for DPA is to extract cryptographic keys for encryptions or decryptions performed on a sealed platform. For the Data Encryption Standard (DES), DPA has proved extremely effective; low-cost smart cards performing DES have proven, in recent experience, to be highly vulnerable to DPA. Any form of encryption or decryption which is similar to DES would necessarily have similar vulnerabilities when incarnated on low-cost smart cards or similar sealed platforms.

Implementation of a DPA attack to find a DES key involves two phases, namely data collection followed by data analysis. Data collection for DPA may be performed by sampling a device's power consumption during cryptographic operations as a function of time or number of clock cycles. For DPA, a number of cryptographic operations using the target key are observed. To perform such an attack on a smart card, one processes a large number (a thousand or more) DES encryptions (or decryptions) on distinct plaintexts (or ciphertexts), recording the power profile, the input, chosen at random by the attacker; and the output, computed by the smartcard as the encrypted of decrypted value with the hidden key for each.

Each power profile is referred to as a sample. In each round of DES, the output of a given S-box is dependent on both the data to be encrypted (or decrypted) and the key. Since the attacker knows the input text, he guesses what the value of the key is, that was used to generate a particular power signature sample, so he can determine whether a particular output bit of a given S-box is 1 or 0 for the particular data used in the sample. Each standard S-box has a 6-bit input and a 4-bit output. Typically, this analysis begins in round 1 or 16 since those are the ones where the attacker knows either the exact inputs (for round 1) or outputs (for round 16) for the respective S-box. The attacker does not know the key, but because the DES algorithm only performs one S-box lookup at a time, it is only necessary to guess the six bits of the secret key that are relevant to the S-box being observed and corresponding to the power consumption at that time. As only 6-bits are relevant, it is only necessary to test $2^6=64$ possible sequences of values for a given 6-bit portion of the 56-bit secret key. For each guess of the values of these six bits, one divides the samples into two groups: those in which the targeted output bit, that is, one of the four output bits from a targeted S-box which is chosen as a target in the first round of the attack, is a 1 if the attacker's guess of the six key bits is correct (the 1-group), and those in which it is a 0 if the attacker's guess of the six key bits is correct (the 0-group). The power samples in each group are then averaged. On average, modulo minor asymmetries in DES, those portions of the averaged power profiles which are affected only by bits other than the particular output bit mentioned above, should be similar, since on average, in both groups, they should be 1 for about half of the samples in each group, and 0 for about half of the samples in each group. However, those portions of the averaged power profiles which are affected by the above-mentioned output bit should show a distinct difference between the 1-group and the 0-group. The presence of such a difference, or multiple such differences, indicates that the guessed value of the six key bits was correct. Its absence, or the absence of such differences, shows that the guessed value of the six key bits was incorrect. This process of guessing at the value of the secret key, dividing the power signature samples into those which will yield a 1-output and those which will yield a 0-output (the 1-group and 0-group respectively), averaging the profiles, and seeking the above-mentioned distinct difference, is repeated until a guess is shown to be correct. One then has six bits of the key. The above guessing procedure is repeated for the other seven S-boxes. When all S-boxes have been treated in this way, one has obtained 48 out of the 56 key bits, leaving only eight bits undetermined. This means one need only search a remaining key space of $2^8=256$ possible keys to find the balance of the correct secret key. It becomes apparent how little information the attacker needs to employ such an attack. The attacker does not have to know the specific code used to implement DES, the memory layout used for storing the S-boxes, where in the power profile the distinct difference or difference, if any, is expected to appear for a correct guess; how many such distinct differences are expected to appear in the power profile for a correct guess; or whether the chosen S-box output bits are normal or complemented as flipping 1s and 0s will produce the same kind of distinct difference. DPA is only dependent on whether such a difference exists, not in the sign, i.e. + or −, of any given difference.

All an attacker really needs to know in order to mount a successful attack is that it is DES which is being attacked, and that the implementation of DES, at some point, employs a bit which corresponds to a specific output of the S-box, in such away that its use will affect the power profile samples. The paucity of knowledge required to make a successful DPA attack which completely cracks a hidden DES key on a sealed platform clearly shows that DPA is a very effective means of penetrating a sealed platform. Only one specific form of DPA attack is described herein, but there are many related forms of DPA attacks which are also possible.

While the effects of a single transistor switching would be normally impossible to identify from direct observations of a device's power consumption, the statistical operations used in DPA are able to reliably identify extraordinarily small differences in power consumption.

Physical measures to protect sealed platforms against attack are known to include enclosing systems in physically durable enclosures, physical shielding of memory cells and data lines, physical isolation, and coating integrated circuits with special coatings that destroy the chip when removed. While such techniques may offer a degree of protection against physical damage and reverse engineering, these techniques do not protect against non-invasive power analysis methods. Some devices, such as those shielded to United States Government Tempest specifications, use large capacitors and other power regulation systems to minimize variations in power consumption, enclosing devices in shielded cases to prevent electromagnetic radiation, and buffering inputs and outputs to hinder external monitoring. These techniques are often expensive or physically cumbersome, and are therefore inappropriate for many applications, for smartcards, secure microprocessors, and other small, low-cost, devices. Physical protection is generally inapplicable or insufficient due to reliance on external power sources, the physical impracticality of shielding, cost, and other characteristics imposed by a sealed platform's physical constraints such as size and weight.

In contrast to physical protection, smartcards may also be protected from a power analysis attack to an extent, at the software level, by representing data in a "Hamming-neutral" form. The Hamming weight of a bit string, such as a data word or byte, is the quantity of bits in the bit string with a value of 1. For example, 10100 will have a Hamming weight of 2, and 1111 will have a Hamming weight of 4. A set of "Hamming neutral" bit-strings is a set of bit-strings that all have the same number of 1s, for example, the set {011, 101, 110} is a Hamming-neutral set. If all of the data bytes manipulated by a software application have the same number of 1s, the power consumed by the device and the noise it emits will not vary as the device processes this data. For example, one could encode a bit string by replacing each "1" with a "10", and each "0" with a "01". All bit-strings would then have an equal number of 1s and 0s, and there would be no detectable power or noise variation between any pair of bit-strings.

This technique is known in the art of electrical signaling and hardware design, where it is referred to as power-balanced or differential signaling. The benefits of such circuits include. reduction in noise emissions or induction of crosstalk in other circuits; reduction in ground bounce; because power requirements are constant, the voltage of the ground bus does not rise locally when a circuit switches from low to high; and independence from environmental noise; as both electrical lines in a differential pair are influenced by essentially the same level of environmental noise, there is theoretically no net difference detected at the receiving end. These techniques are commonly used in military, super-computer and industrial control applications.

Since a normal, unsealed platform is susceptible to attacks potentially more powerful than power analysis (PA), the use of PA in discovery of secret information is primarily directed towards sealed platforms, such as smartcards. However, a simulated power profile of execution can be generated on a simulator for any processor, so it is possible to analyze algorithms for execution on ordinary, unsealed platforms using PA. Hence, although the most urgent need for PA resistance is for use on sealed platforms, such as smartcards, PA resistance is applicable to a much wider variety of platforms. Improved security is therefore useful for such devices to be securely used in a broad range of applications in addition to traditional retail commerce, including parking meters, cellular and pay telephones, pay television, banking, Internet-based electronic commerce, storage of medical records, identification and security access. There is therefore a need for a method, apparatus and system to reduce the amount of useful information leaked to attackers without resulting in excessive overheads. Reducing leakage refers generally to reducing the leakage of any information that is potentially useful to an attacker trying to determine secret information.

In WO 01/61915 the vulnerability of a system is reduced by introducing a randomness to the observable operation, thereby frustrating the correlation if output power emissions with any meaningful internal processing.

In U.S. Pat. No. 6,278,783 methods and apparatus are described for improving DES and other cryptographic protocols against external monitoring attacks by reducing the amount and signal-to-noise ratio of useful information leaked during processing. An improved DES implementation of the invention instead uses two 56-bit keys (K1 and K2) and two 64-bit plaintext messages (M1 and M2), each associated with a permutation (i.e., K1P, K2P and M1P, M2P) such that K1P{K1} XOR K2P{K2} equals the "standard" DES key K, and M1P{M1} XOR M2P{M2} equals the "standard" message. During operation of the device, the tables are preferably periodically updated, by introducing fresh entropy into the tables faster than information leaks out, so that attackers will not be able to obtain the table contents by analysis of measurements. The technique is implementable in cryptographic smartcards, tamper resistant chips, and secure processing systems of all kinds.

WO 01/08012 describes an apparatus and a method for preventing information leakage attacks on a microelectronic assembly performing a cryptographic algorithm by transforming a first function, used by the cryptographic algorithm, into a second function, the method including the steps of receiving a masked input data having n number of bits that is masked with an input mask, wherein n is a first predetermined integer; processing the masked input data using a second function based on a predetermined masking scheme; producing a masked output data having m number of bits that is masked with an output mask, wherein m is a second predetermined integer.

In WO 00/02342 methods and apparatus for increasing the leak-resistance of cryptographic systems using an indexed key update technique are disclosed. In one embodiment, a cryptographic client device maintains a secret key value as part of its state. The client can update its secret value at any time, for example before each transaction, using an update process that makes partial information that might have previously leaked to attackers about the secret no longer usefully describe the new updated secret value. By repeatedly applying the update process, information leaking during cryptographic operations that is collected by attackers rapidly becomes obsolete. Thus, such a system can remain secure against attacks involving analysis of measurements of the device's power consumption, electromagnetic characteristics, or other information leaked during transactions. The present invention can be used in connection with a client and server using such a protocol. To perform a transaction with the client, the server obtains the client's current transaction counter. The server then performs a series of operations to determine the sequence of transformations needed to re-derive the correct session key from the client's initial secret value. These transformations are performed, and the result is used as a transaction session key.

WO 99/67909 proposes a leak minimization for smartcards and other cryptosystems using a reduction of the amount of useful information leaked during processing. This is accomplished by implementing critical operations using "branchless" or fixed execution path routines whereby the execution path does not vary in any manner that can reveal new information about the secret key during subsequent operations. More particularly, various embodiments of the invention include: implementing modular exponentiation without key-dependent conditional jumps; implementing modular exponentiation with fixed memory access patterns; implementing modular multiplication without using leak-prone multiplication-by-one operations; and implementing leak-minimizing multiplication and other operations for elliptic curve cryptosystems.

In WO 99/67766 methods and apparatus are disclosed for performing computations in which the representation of data, the number of system state transitions at each computational step, and the Hamming weights of all operands are independent of computation inputs, intermediate values, or results. Exemplary embodiments implemented using conventional leaky hardware elements such as electronic components, logic gates, etc. as well as software executing on conventional leaky microprocessors are described. Smartcards and other tamper-resistant devices of the invention provide improved resistance to cryptographic attacks involving external monitoring.

In WO 99/63696 methods and apparatus are disclosed for securing cryptosystems against external monitoring attacks by reducing the amount and signal to noise ratio of useful information leaked during processing. This is generally accomplished by incorporating unpredictable information into the cryptographic processing. Various embodiments of the invention use techniques such as reduction of signal to noise ratios, random noise generation, clock skipping, and introducing entropy into the order of processing operations or the execution path. The techniques may be implemented in hardware or software, may use a combination of digital and analog techniques, and may be deployed in a variety of cryptographic devices.

OBJECT AND ADVANTAGES OF THE INVENTION

According to a first aspect of the invention as set forth in claims 1 and 2, a data-processing system is proposed that comprises a cryptographic key stored in a memory that has a lower level of information leakage than another memory. The use of this key brings in the advantage that the information that is encrypted under use of this key is protected thereby from external attacks, in particular differential power analysis. The key itself is less prone to such attacks due to the higher level of attack immunity through less information leakage. A typical data-processing system would be a machine-readable medium such, more particularly a sealed platform like a chipcard, also referred to as smartcard, i.e. a machine-readable device that comprises its own processor and memory. In particular, as the data-processing system a cryptographic device or system can be used.

If the first unencrypted information comprises a second cryptographic key usable for decrypting second encrypted information for the operation, a two-stage encryption process is used which advantageously combines local security through the second cryptographic key, with a global security through the first cryptographic key. The second cryptographic key is typically a personal key, unique to the data-processing system or its user. The first cryptographic key is typically a key not unique to the data-processing system or its user but unknown to external entities. A person knowing the first cryptographic key can not access the secret information protected by the second cryptographic key without using DPA, and a person knowing the second cryptographic key can nevertheless not find out the first cryptographic key in order to use that information for accessing secret information on other machine-readable media.

If the data-processing system comprises stored code for executing a personalization step, the personalizing entity only need execute that step via the data-processing system in order to achieve the personalized state, including the use of the first cryptographic key. Thereby the use of that key can be transparent, i.e. not visible, to the personalizing entity.

If the data-processing system comprises stored code for executing an operation execution step, that step can include the decryption step to reveal the information that was previously encrypted with the first cryptographic key. Thereby also the decryption step is executed transparently to the outside world, including personalizing entity and the user of the data-processing system.

A typical example for the data-processing system would be a smartcard.

According to a second aspect of the invention as set forth in claim 6, a method of processing such a data-processing system is proposed. The processing can be interpreted as a personalization step in which the data-processing system is turned from a non-customized product into a customized product by enhancing it with specific information, unique to that data-processing system.

The personalization step can be performed by writing the unencrypted information to its target memory location, e.g. the EEPROM, afterwards scanning the EEPROM for any such information and executing the encryption on it. That sensitive information in the EEPROM is encrypted and thereby protected. A typical example for that sensitive information are cryptographic keys. Those can comprise personal keys or other keys. In object- or type-based programming languages, no change to the APIs, or the applications making use of such keys are required.

No production and testing procedures need to be changed as the complete procedures as established need not be changed; only at the end of testing and production, the keys are encrypted, again transparently to any further on-card or off-card software or hardware. The first cryptographic key does not have to be known to the personalization agency.

According to a third aspect of the invention as set forth in claim 7, a method of executing an operation on such a data-processing system is proposed. That method comprises a decryption step before the actual execution of the operation. That decryption step is executed on the encrypted information that has been loaded from the first persistent memory to a less-leaking memory. The decryption step is hence executed in an environment which is less-leaking and hence less prone to power analysis attack. The decryption step itself remains unnoticed by the external user and merely effects a longer, although not significantly longer, execution time for that operation.

According to a third aspect of the invention as set forth in claim 8, a computer program product comprising program code means for performing a method as described above is proposed. The computer program product can be in its simplest form a storage medium loaded with the program code. The storage medium advantageously could be integrated into the data-processing system.

SUMMARY OF THE INVENTION

Smartcard memory, including EEPROM, leaks information about its contents, when those contents are accessed for reading stored information. One way for an attacking entity to make use of that leakage is by means of differential power analysis (DPA), when read-operations are monitored by means of chip-power consumption, and the actual EEPROM contents are derived. If such EEPROM content is a secret key guarding an electronic transaction for example, the security of the whole electronic transaction system is in peril.

The invention is directed to a data-processing system comprising a processor and first encrypted information in a first persistent memory whose level of information leakage is higher than that of a second persistent memory. In the second persistent memory is stored a first cryptographic key for decrypting the first encrypted information, thereby generating therefrom first unencrypted information that is usable by the processor for executing an operation.

The invention is also directed to a data-processing system comprising a processor and first encrypted information in a first persistent memory whose level of information leakage is higher than that of a second persistent memory. In the second persistent memory is stored a first cryptographic key The first cryptographic key may be used for decrypting the first encrypted information, thereby generating the first unencrypted information.

Also a combination of the two cases is possible, i.e. the same first cryptographic key can be used for the encryption and decryption of the first information.

The invention is also directed to a method of processing such a data-processing system that has an operating system, the method comprising a writing step for writing first unencrypted information into the first persistent memory, an encryption step for encrypting the first unencrypted information under use of the first cryptographic key, creating therefrom first encrypted information in the first persistent memory, and an access-limitation step for setting the data-processing system to a state in which writing into the first persistent memory is controlled by the operating system.

The invention is also directed to a method of executing an operation on such a data-processing system, the method comprising a decryption step for decrypting the first encrypted information under use of the first cryptographic key, thereby generating therefrom first unencrypted information and an execution step for executing an operation by the processor, using the first unencrypted information. The invention is also directed to a computer program product comprising program code means for performing such method or methods.

The invention is applicable to any object- or type-based programming language running on any data-processing system running that stores sensitive information in a data storage medium that is susceptible to external probing. An example would be the JavaCard runtime environment.

By tracking sensitive information within the first persistent memory and protecting it by means of a first cryptographic key that is used to encrypt the sensitive information when stored in the persistent memory, the sensitive information is protected from being analyzed through DPA. The first cryptographic key is again used to decrypt the sensitive information when the sensitive information is read from the persistent memory for actual use. An example for the sensitive information is a second cryptographic key. The sensitive information stored in the persistent memory of a probing-attack-prone storage technology operating on object- or type-based programming language, such as an EEPROM in a smartcard, is hence better protected against fraudulent probing e.g. by differential power attacks.

DESCRIPTION OF THE DRAWINGS

Examples of the invention are depicted in the drawing and described in detail below by way of example. It is shown in FIG. 1 a schematic block diagram of a smartcard with its components.

The FIGURE is for sake of clarity and not shown in real dimensions, nor are the relations between the dimensions shown in a realistic scale.

DETAILED DESCRIPTION OF PREFERRED EMBODIMENTS

In the following, the various exemplary embodiments of the invention are described.

A smartcard typically embeds an electronic chip in a plastic card. The electronic chip may include, for example, a microprocessor or similar device, read-only memory (ROM), and/or read-write random access memory (RAM). The electronic-chip may also include other electronic components such as digital signal processors (DSPs), field-programmable gate arrays (FPGAs), electrically-erasable programmable read-only memory (EEPROM) and miscellaneous support logic. Generally, the electronic chip is glued into a recessed area of a plastic card and is covered by a printed circuit which provides the electrical interface to an external smartcard reader. The standard configuration of the input and output pads of the printed circuit generally includes power (VCC), ground (GND), a clock input (CLK) and a serial input/output pad (I/O). Several additional unconnected pads (N/C) are also included in the standard configuration. Because the plastic card is somewhat flexible, the electronic chip should be small enough to avoid breaking. This limits the physical size of the electronic chip to a few millimeters across, and also limits the number of electronic components that can be supported. Contactless smartcards are also in use, which communicate with an external smartcard reader using radio frequencies or other wireless communication media. Such smartcards are generally equipped with an internal antenna, rather than the input and output pads of the printed circuit.

Figure 1:
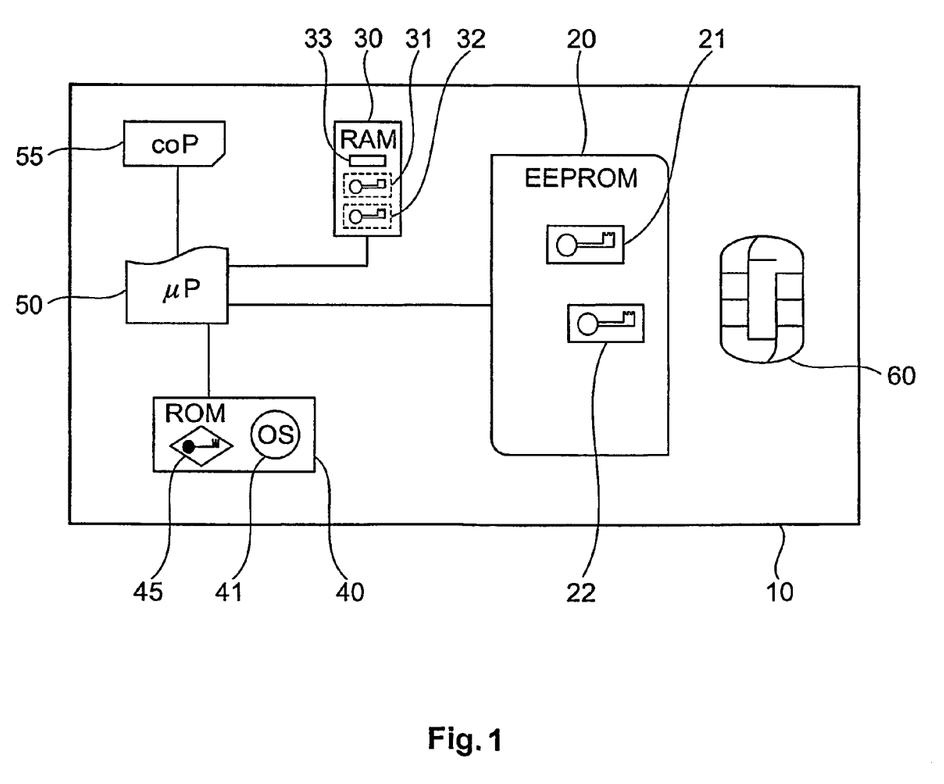

In FIG. 1 a data-processing system 10, which here is a smartcard, is depicted that comprises an EEPROM 20, also referred to as first persistent memory, a second persistent memory 40, also referred to as ROM, and a volatile memory 30, also referred to as RAM. These three memories 20, 30, 40 are connected to a processor 50 which is again connected to a DES co-processor 55. The smartcard 10 further comprises a connector field 60 for connection to an external device. In the ROM 40 are located an operating system 41 and a first cryptographic key, also referred to as cryptographic master key 45. In the EEPROM 20 a second cryptographic key 21 and an third cryptographic key 22 are stored. In the RAM 30 second encrypted information 33 is stored. The co-processor 55 can perform any type of cryptographic operation, here DES is selected for exemplary purposes.

For sake of better understanding, first a process without use of the cryptographic master key 45 is explained. The second cryptographic key 21 and third cryptographic key 22 are in such a case present in the EEPROM 20 in a non-encrypted form and are present for being used in an encryption process respectively decryption process performed by the DES co-processor 55 in assistance to the processor 50. If during the execution of an application the processor 50 is instructed to perform an operation that needs to make use of one or more of the cryptographic keys 21, 22, the DES co-processor 55 is activated. It is assumed for this example, that the second cryptographic key 21 is here needed to perform a decryption. The processor 50 accesses the EEPROM 20 to retrieve therefrom the second cryptographic key 21. The second cryptographic key 21 is loaded from the EEPROM 20 via the processor 50 to the RAM 30. The DES co-processor 55 retrieves the second cryptographic key 21 from the RAM 30 via the processor 50 and retrieves via the processor 50 also the data that is to be decrypted under use of the cryptographic key 21, from one of the memories 20, 30, 40. Here that data comprises the second encrypted information 33. Then the DES co-processor 55 performs the decryption and delivers the decrypted data to the processor 50.

A malicious user could perform a DPA attack on that operation, in particular, sniffing on the leakage of the signal between the EEPROM 20 and the processor 50 by using a suitable leakage-detecting probe in combination with corresponding software.

In order to make such a DPA attack harder, the cryptographic master key 45 is used in accordance with the invention. The cryptographic keys 21, 22 reside in the EEPROM 20 in an encrypted form, namely having been previously encrypted under use of the cryptographic master key 45. They are hence present as first encrypted information. The corresponding encryption process shall be explained further below, but first the decryption shall be addressed here. An operation is assumed that needs the second cryptographic key 21. That operation is executed by the processor 50 in an operation execution step. Since the second cryptographic key 21 resides in the EEPROM 20 in encrypted form, the operation execution step comprises a decryption step to enable access to the second cryptographic key 21 in a decrypted form and to thereby enable use of it. Therefor the processor 50 not only retrieves the encrypted second cryptographic key 21 from the EEPROM 20 but also initiates the execution of a decryption step of the encrypted second cryptographic key 21.

The encrypted second cryptographic key 21 is loaded from the EEPROM 20 via the processor 50 to the RAM 30. The cryptographic master key 45 is loaded from the ROM 40 via the processor 50 to the RAM 30. The DES co-processor 55 retrieves the cryptographic master key 45 from the RAM 30 via the processor 50 and retrieves via the processor 50 also the encrypted second cryptographic key 21 that is to be decrypted under use of the cryptographic master key 45, from the RAM 30. Then the co-processor 55 performs the decryption step on the encrypted second cryptographic key 21 and delivers the resulting decrypted second cryptographic key 21 to the RAM 30.

Next follows the execution step of the operation execution step. The co-processor 55 retrieves the decrypted second cryptographic key 21 from the RAM 30 via the processor 50 and retrieves via the processor 50 also the data 33 that is to be decrypted under use of the decrypted second cryptographic key 21, from the RAM 30. Then the co-processor 55 performs the decryption and delivers the decrypted data to the processor 50. This is hence a series of decryption processes. The advantage is that the operation of retrieving the second cryptographic key 21 from the EEPROM 20 is less prone to a DPA attack, since the information that is transferred from the EEPROM 20 and that suffers from the information leakage of the EEPROM 20, namely the second cryptographic key 21, is transferred in encrypted form. Since the leakage of the ROM 40 and the RAM 30 is lower than the leakage of the EEPROM 20, the susceptibility of the overall system to DPA attacks is reduced.

In the following, the process of personalizing the smartcard 10 will be described. The smartcard 10 is manufactured by a smartcard manufacturer to comprise the plastic carrier with the embedded chip. The chip already contains the pre-stored cryptographic master key 45 in the ROM 40. The receiving entity, which typically is a smartcard-issuing entity, then processes the card in a personalization step, i.e. prepares this smartcard 10 for future use by a specific person. Therefore the smartcard issuer equips the smartcard 10 with personal information, namely here the cryptographic keys 21, 22 which are first written into the EEPROM 20. This writing step is performed in a secure environment, i.e. an environment that does not allow accessing the sensitive personal information. The smartcard issuer himself is a trusted party in that it may be assumed that it does not perform an attack on the system by using the cryptographic keys 21, 22 or even the cryptographic master key 45.

The smartcard 10 arrives at the smartcard issuer with the operating system 41 pre-stored. In that operating system 41 a personalization step is contained in a programmed form, which step is initiated by the smartcard issuer after writing the personal information 21, 22 to the EEPROM 20. The personalization step encompasses two substeps, an encryption step and an access-limitation step.

The personalization step starts by performing the encryption step that encrypts the first unencrypted information, i.e. the cryptographic keys 21, 22. Therefor the EEPROM 20 is scanned for all information that is to be encrypted under use of the cryptographic master key 45. This information here comprises the cryptographic keys 21, 22. The cryptographic keys 21, 22 can be recognized in a scanning step by the scanning algorithm and once these have been located, they are encrypted and written as encrypted cryptographic keys 21, 22 back into the EEPROM 20. The smartcard issuer himself does for the encryption step not need to know the cryptographic master key 45 and in fact does not even need to know that there is a cryptographic master key 45 at all. The encryption step can be executed without the smartcard issuer knowing about it.

In order for the scanning step to recognize the cryptographic keys, these should advantageously be tagged, i.e., discernible as such. This is certainly the case for the smartcard being a JavaCard, since Java is an object-based system, in which all sensitive information is tagged by a Java class named "Key".

After the encryption step, the access-limitation step effects that the smartcard 10 is set to a state in which the writing into the EEPROM 20 is limited, namely limited by the access control through the operating system 41. That limitation ensures that writing is no longer allowed into certain areas of the smartcard 10 amongst which is the area in which the encrypted cryptographic keys 21, 22 are located. Thereby a later modification in that forbidden area, including fraudulous attempts, is excluded. After completion of the personalization step, the smartcard is in the so-called personalized state. The smartcard 10 is issued to the end-customer or user in this state.

In operation of the smartcard, as already described further above, the decryption runs via the DES coprocessor 55, which loads the cryptographic keys 21, 22 from the EEPROM 20. That loading step is prone to DPA but since the cryptographic keys 21, 22 are present only in the encrypted form, and hence also transmitted in that form, that attack has a lower success rate. The cryptographic master key 45 is loaded to the DES coprocessor 55 from the ROM 40 and since the ROM 40 is less power-consuming than the EEPROM 20 or the RAM 30, a successful attack via DPA is much harder and hence less probable.

In principle, the operation execution step can be executed without that the environment around the smartcard knows about the use of the cryptographic master key 45. From the perspective of the result of the operation that is executed, there is no difference. The advantage lies in the fact that the described method and system increase system security but are totally transparent to the outside environment.

It is hence suggested that the sensitive data, i.e., the cryptographic keys 21, 22 stored in the EEPROM 20 are stored in an encrypted form, not as plain data prone to the attack stated above. The encryption step is performed under use of another secret key, the cryptographic master key 45, that may either be unique to the chip, or unique to a piece of software, called mask, containing the program logic accessing the EEPROM 20. This is achieved transparently to an application possibly making use of the cryptographic keys 21, 22. The encrypting cryptographic key 45 resides in non- or less leaking storage, such as the ROM 40.

With other words, the introduction of the cryptographic master key 45 effects a reduction of the attackability of the smartcard 10, through a reduction of information leakage, also referred to as power dissipation, or attack susceptibility. The cryptographic master key 45 is applied for encryption of the first unencrypted information 31, 32, e.g. comprising clear-text keys, to form therefrom the first encrypted information 21, 22. Therefore the writing process is amended, and the clear-text keys are encrypted under use of the cryptographic master key 45, that is an internal chip- or mask-specific key, before they are stored into the EEPROM 20.

For decryption, the key-reading or -using method is intercepted, and the encrypted cryptographic keys 21, 22 are first decrypted in non- or less-leaking memory, such as the RAM 30, to gain the first unencrypted information 31, 32, before actual use thereof.

In an extended form, the processing method for personalization provides for a scanning of the complete EEPROM 20 for the therein-stored cryptographic keys 21, 22, and encrypting them all according to the same procedure as outlined above. This means, a complete EEPROM image consisting of non-sensitive and sensitive information in plain form can be converted to an EEPROM image consisting of non-sensitive information in plain form and sensitive information in encrypted form. A technology employable to do this is a memory-walking technology seeking out object types, i.e., cryptographic keys in the given scenario. In the case of a JavaCard, the known garbage collection mechanism can be utilized for this, as it also traverses the complete EEPROM 20. The benefit of this is that the smartcard 10 can be prepared and tested with all data, i.e. sensitive and non-sensitive, in plain form, and only at the end of testing and production be changed over to the secure mode in which the cryptographic keys 21, 22 are encrypted for use.

The described embodiments are combinable in part as well as in whole.

It is obvious for the person skilled in the art that the present invention can be realized in hardware, software, or a combination of these. Also, it can be implemented in a centralized fashion on one single computer system, or in a distributed fashion where different elements are spread across several interconnected computers or computer systems, whereby any kind of a computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Any disclosed embodiment may be combined with one or several of the other embodiments shown and/or described. This is also possible for one or more features of the embodiments.

It is obvious that a person skilled in the art can modify the shown arrangements in many ways without departing from the gist of the invention which is encompassed by the subsequent claims.

What is claimed is:

1. A method of processing and executing an operation on a data-processing system comprising a processor, a first persistent memory, a second persistent memory, an operating system, and a first cryptographic key stored in said second persistent memory, the method comprising:

a writing step for writing first unencrypted information into said first persistent memory, wherein the first unencrypted information is selected to comprise a second cryptographic key usable for decrypting second encrypted information for the operation;

an encryption step for encrypting said first unencrypted information under use of said first cryptographic key, creating therefrom first encrypted information in said first persistent memory;

an access-limitation step for setting the data-processing system to a state in which writing into said first persistent memory is controlled by the operating system;

a decryption step for decrypting said first encrypted information under use of said first cryptographic key, thereby generating therefrom the first unencrypted information; and an execution step for executing the operation by said processor, using the first unencrypted information generated in the decryption step; and a scanning step for scanning the first persistent memory for cryptographic keys, the scanning step comprising walking memory to seek an object type representing a cryptographic key; and wherein the first persistent memory has a first level of power dissipation;

wherein the second persistent memory has a second level of power dissipation that is lower than said first level of power dissipation; and wherein the encryption step is configured to encrypt cryptographic keys recognized by the scanning step.

* * * * *